(12) United States Patent
Fujinaka

(10) Patent No.: US 9,829,675 B2
(45) Date of Patent: Nov. 28, 2017

(54) LENS BARREL

(71) Applicant: Panasonic Intellectual Property Management Co., Ltd., Osaka (JP)

(72) Inventor: Hiroyasu Fujinaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/337,176

(22) Filed: Oct. 28, 2016

(65) Prior Publication Data

US 2017/0212325 A1     Jul. 27, 2017

(30) Foreign Application Priority Data

Jan. 21, 2016  (JP) .................................. 2016-009718
Oct. 28, 2016  (JP) .................................. 2016-211315

(51) Int. Cl.
*G02B 7/02*   (2006.01)
*G02B 7/10*   (2006.01)
*G02B 27/64*  (2006.01)

(52) U.S. Cl.
CPC ............. *G02B 7/102* (2013.01); *G02B 7/023* (2013.01); *G02B 7/025* (2013.01); *G02B 27/646* (2013.01)

(58) Field of Classification Search
USPC .................................. 359/694–704, 811–824
See application file for complete search history.

(56) References Cited

U.S. PATENT DOCUMENTS

| 7,367,675 B2* | 5/2008 | Maddalena ............ A61B 3/028 351/237 |
| 9,759,887 B2* | 9/2017 | Kasuga .................... G02B 7/04 |
| 2006/0087618 A1* | 4/2006 | Smart .................... A61B 3/005 351/222 |
| 2010/0201942 A1* | 8/2010 | Hess ...................... A61B 3/022 351/201 |
| 2015/0173613 A1* | 6/2015 | Gerrans .................. A61B 3/14 351/206 |

FOREIGN PATENT DOCUMENTS

JP      2010-191070      9/2010

* cited by examiner

*Primary Examiner* — Mohammed Hasan
(74) *Attorney, Agent, or Firm* — Wenderoth, Lind & Ponack, L.L.P.

(57) ABSTRACT

A lens barrel includes: a base frame having a first through-hole; an adhesion plate having a second through-hole; a lens frame disposed within the base frame; and an adhesively fixing portion fixing the lens frame to the base frame, wherein the adhesion plate is disposed in a vicinity of the first through-hole and movably held by the base frame, the lens frame includes a projection projecting radially relative to an optical axis of the lens barrel, the projection being engaged with the second through-hole and inserted in the first through-hole, the projection is movable within the first through-hole so as to change a position of the lens frame relative to the base frame, and the adhesively fixing portion is disposed in the first through-hole.

8 Claims, 11 Drawing Sheets

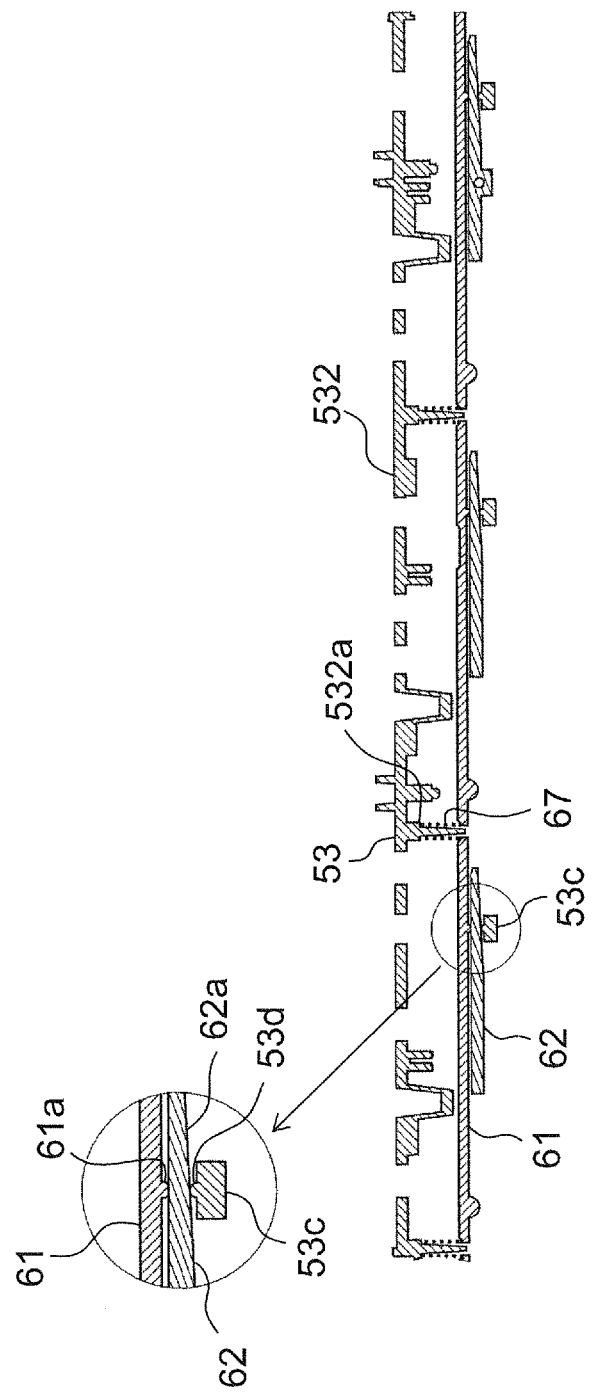

LENS BARREL

CROSS REFERENCE TO RELATED APPLICATION

This application claims the benefit of priority of Japanese Patent Application Number 2016-009718 filed on Jan. 21, 2016 and Japanese Patent Application Number 2016-211315 filed on Oct. 28, 2016, the entire content of which are hereby incorporated by reference.

BACKGROUND

1. Technical Field

The present disclosure relates to a lens barrel for use in digital still cameras, etc.

2. Description of the Related Art

Japanese Unexamined Patent Application Publication No. 2010-191070 (Patent Literature 1) discloses a lens barrel which includes: a lens-holding member which holds a lens; a cylindrical barrel body; and a lens-adjusting mechanism for adjusting the position of the lens-holding member in the inner peripheral side of the barrel body. The lens barrel has through-holes formed in the outer peripheral surface of the barrel body, and pin members attached on the outer peripheral surface of the lens-holding member through the through-holes. The lens-holding member is fixed to the barrel body by an adhesive filled around the pin members through the through-holes.

SUMMARY

The present disclosure provides a lens barrel having an improved configuration for adjusting and fixing a position of a lens frame to the lens barrel.

A lens barrel according to one aspect of the present disclosure includes: a base frame having a first through-hole; an adhesion plate having a second through-hole; a lens frame to which a lens is fixed, the lens frame being disposed within the base frame; and an adhesively fixing portion fixing the lens frame to the base frame. The adhesion plate is disposed in a vicinity of the first through-hole and movably held by the base frame. The lens frame includes a projection projecting radially relative to an optical axis of the lens barrel, the projection being engaged with the second through-hole and inserted in the first through-hole. The projection is movable within the first through-hole, so as to change a position of the lens frame relative to the base frame. The adhesively fixing portion is disposed in the first through-hole and fixes the projection of the lens frame, the base frame, and the adhesion plate to each other.

The lens barrel according to the present disclosure is effective in achieving an improved configuration for adjusting and fixing a position of a lens frame to the lens barrel.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5D is an exploded cross-section view of the fifth-group base frame in FIG. 5A, taken along a line B-B extending in the circumferential direction of the fifth-group base frame;

DETAILED DESCRIPTION OF THE EMBODIMENTS

Figure 1A:
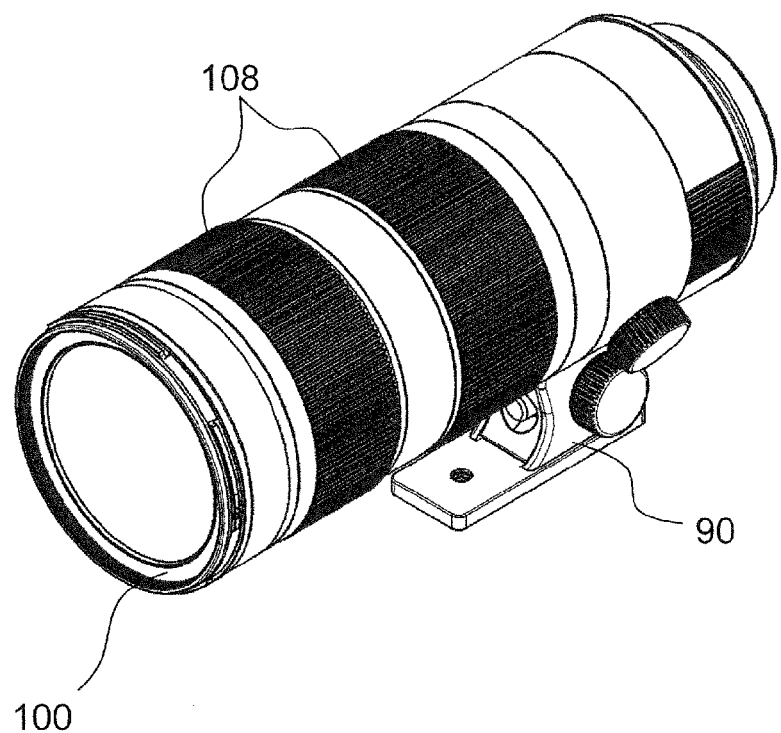
FIG. 1A is a perspective view of an appearance of a lens barrel according to an embodiment of the present disclosure.

In relation to the conventional technique described in "Description of the Related Art," the inventor has obtained the following findings. According to Patent Literature 1, since the pins attached to the lens-holding member are fixed to the barrel body with the adhesive in the through-holes of the barrel body, strength of the fixed portion depends on the strength of the adhesive between the through-holes and the pins. Consequently, fixation strength between the lens-holding member and the barrel body is low. In other words, the strength of an adjusted portion of a lens barrel is low. Such being the case, the inventor has found a lens barrel having an improved strength of the adjusted portion to be as follows.

A lens barrel according to one aspect of the present disclosure includes: a base frame having a first through-hole; an adhesion plate having a second through-hole; a lens frame to which a lens is fixed, the lens frame being disposed within the base frame; and an adhesively fixing portion fixing the lens frame to the base frame. The adhesion plate is disposed in a vicinity of the first through-hole and movably held by the base frame, and the lens frame includes a projection projecting radially relative to an optical axis of the lens barrel, the projection being engaged with the second through-hole and inserted in the first through-hole. The projection is movable within the first through-hole, so as to change a position of the lens frame relative to the base frame. The adhesively fixing portion is disposed in the first through-hole and fixes the projection of the lens frame, the base frame, and the adhesion plate to each other.

In the above described configuration, the adhesively fixing portion fixes the projection of the lens frame to the base frame via the adhesion plate. For this reason, the force acting on the portion fixed by the adhesively fixing portion is distributed to the adhesion plate, thereby reducing the stress acting on the adhesively fixing portion. Further, the fixation via the adhesion plate using the adhesively fixing portion increases the adhered area. Thus, fixation strength of the lens frame to the base frame improves. In other words, the strength of the adjusted portion in the lens barrel improves.

The lens barrel may further include an adjusting ring having an arcuate portion which is sandwiched between the base frame and the lens frame in a direction of the optical axis, wherein the arcuate portion varies in thickness angularly about the optical axis. In the above described configuration, as the adjusting ring angularly rotates together with the arcuate portion, a gap between the base frame and the lens frame in the direction of the optical axis varies. This allows adjustment of the position of the lens frame relative to the base frame in the direction of the optical axis.

A gap between the projection of the lens frame and the second through-hole may be less than a gap between the projection of the lens frame and the first through-hole. Further, the second through-hole may have a shape and dimensions equal to a shape and dimensions of a perimeter of the projection of the lens frame. In the above described configuration, the first through-hole is filled with the adhesively fixing portion, thereby reducing escape of the adhesively fixing portion through a gap between the projection of the lens frame and the second through-hole. Thus, the lens frame is fixed the base frame with an adequate amount of the adhesively fixing portion.

The projection of the lens frame may include a first portion which is rotatably disposed on the proximal side of the projection, and a second portion which is disposed eccentrically from the first portion on the distal side of the projection and rotates integrally with the first portion, and the second portion may rotate the first portion and moves the lens frame by rotating. In the above described configuration, the projection of the lens frame moves the lens frame radially of the axis of rotation of the second portion.

The second through-hole may have a shape and dimensions equal to a shape and dimensions of a perimeter of the second portion of the lens frame. In the above described configuration, the first through-hole is filled with the adhesively fixing portion, thereby significantly reducing escape of the adhesively fixing portion through the gap between the projection of the lens frame and the second through-hole. Moreover, the adhesion plate is not moved by the rotation of the second portion.

The adhesion plate may be movably held by the base frame along a wall, in which the first through-hole is formed, of the base frame. The above described configuration allows reduction of constrains on the adhesion plate changing the position of the projection in response to the change of the position of the lens frame.

The projection of the lens frame may comprise a plurality of projections and the first through hole may comprise a plurality of first through holes. The plurality of projections may be disposed spaced apart from one another angularly about the optical axis and the plurality of first through-holes may be disposed spaced apart from one another angularly about the optical axis. In the above described configuration, the lens frame receives the change in position at multiple points spaced apart from one another. Thus, precise adjustment of the position of the lens frame is allowed.

The lens barrel according to another aspect of the present disclosure includes: a base frame; a lens frame to which a lens is fixed, the lens frame being disposed within the base frame; and an adjusting ring having an arcuate portion which is sandwiched between the base frame and the lens frame in a direction of an optical axis of the lens barrel, wherein a thickness of the arcuate portion in the direction of the optical axis varies angularly about the optical axis. In the above described configuration, as the adjusting ring angularly rotates together with the arcuate portion, a gap between the base frame and the lens frame in the direction of the optical axis varies. This allows adjustment of the position of the lens frame relative to the base frame in the direction of the optical axis.

At least one of the base frame and the lens frame may partially be in contact with the adjusting ring. Further, the at least one of the base frame and the lens frame may have a projection in contact with the adjusting ring. The above described configuration allows the at least one of the base frame and the lens frame to be in contact with the adjusting ring even if the adjusting ring is deformed, such as warped, deflected, strained, etc. Further, unlike surface contact, the contact via the projection allows the at least one of the base frame and the lens frame to remain in reliable contact with the adjusting ring.

The lens barrel may further include a biasing spring which biases the at least one of the base frame and the lens frame to the adjusting ring. The above described configuration allows maintaining the adjusting ring in contact with the lens frame, thereby achieving the adjustment of the lens frame stably, using the adjusting ring.

The base frame may include a frame portion and a protrusion protruding from the frame portion in a direction intersecting with the optical axis, wherein the arcuate portion of the adjusting ring is sandwiched between the protrusion and the lens frame, and the biasing spring biases the lens frame to the protrusion between the frame portion and the lens frame. In the above described configuration, the adjusting ring, the lens frame, and the biasing spring can be accommodated within the frame portion, thereby allowing size reduction of the lens barrel.

The adjusting ring may have a plurality of arcuate portions disposed spaced apart from each other angularly about the optical axis. The above described configuration allows the entire lens frame to move evenly, owing to the plurality of arcuate portions.

Hereinafter, embodiments according to the present disclosure will be described in detail, with reference to the accompanying drawings. It should be noted that unnecessarily detailed description may be omitted. For example, detailed description of well-known matters or description previously set forth with respect to substantially the same configuration may be omitted. This is to avoid unnecessary redundancy of description below and for facilitating an understanding of the present disclosure by a person skilled in the art.

The accompanying drawings and the description below are provided for a thorough understanding of the present disclosure by a person skilled in the art, and are thus not intended to limit the subject matter recited in the claims appended hereto.

Embodiment

In the following, lens barrel 100 according to an embodiment of the present disclosure is described with reference to FIGS. 1A through 7D.

[1. Configuration of Lens Barrel]

Figure 1B:
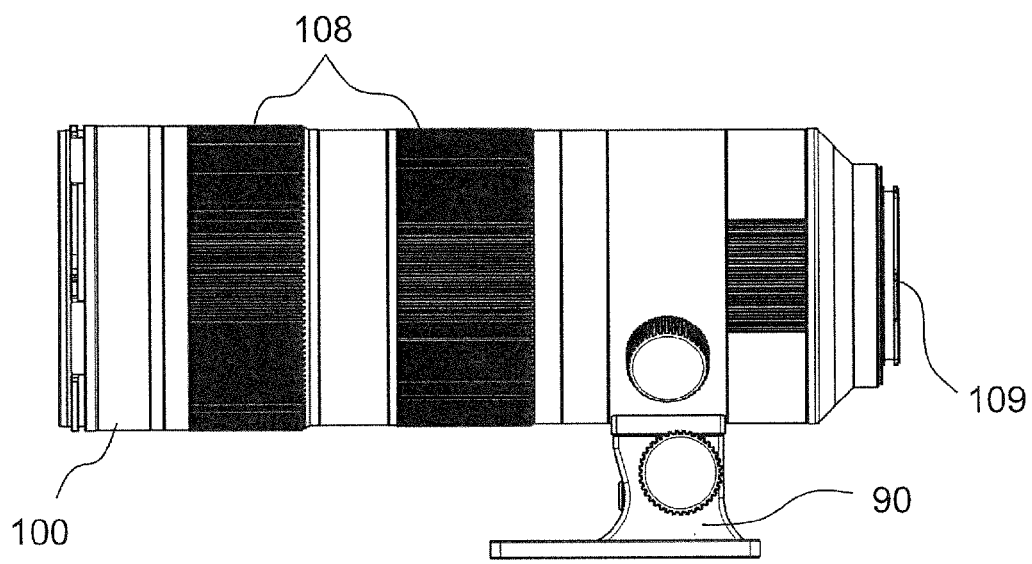
FIG. 1B is a side view of the appearance of the lens barrel according to the embodiment.
Figure 1C:
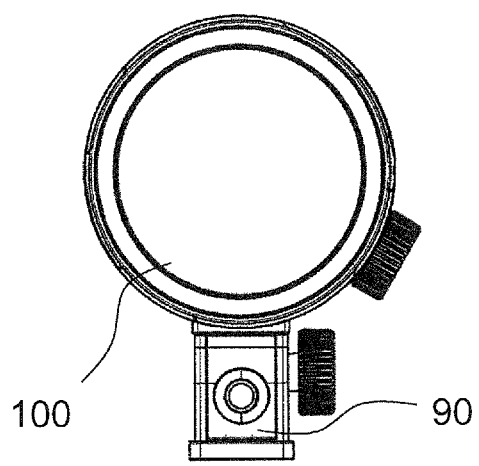
FIG. 1C is a front view of the appearance of the lens barrel according to the embodiment.

FIGS. 1A through 1C are diagrams illustrating an appearance of lens barrel 100 according to the embodiment. FIG. 1A is a perspective view of lens barrel 100. FIG. 1B is a side view of lens barrel 100. FIG. 1C is a front view of lens barrel 100. Lens barrel 100 includes mount 109 which fixes lens barrel 100 to a camera, and operation parts 108 for carrying out operations including zooming and focusing. Lens barrel 100 moves a lens group disposed therein, by operation parts 108 on the lens barrel being operated by a user or by operation parts 108 operating according to an instruction transmitted in an electrical signal from the camera. This allows lens barrel 100 to zoom or adjust focus for an angle of view intended by the user. FIGS. 1A through 1C illustrate lens barrel 100 having tripod mount 90 attached thereto. Tripod mount 90 is for securing lens barrel 100 to a tripod.

Figure 2:
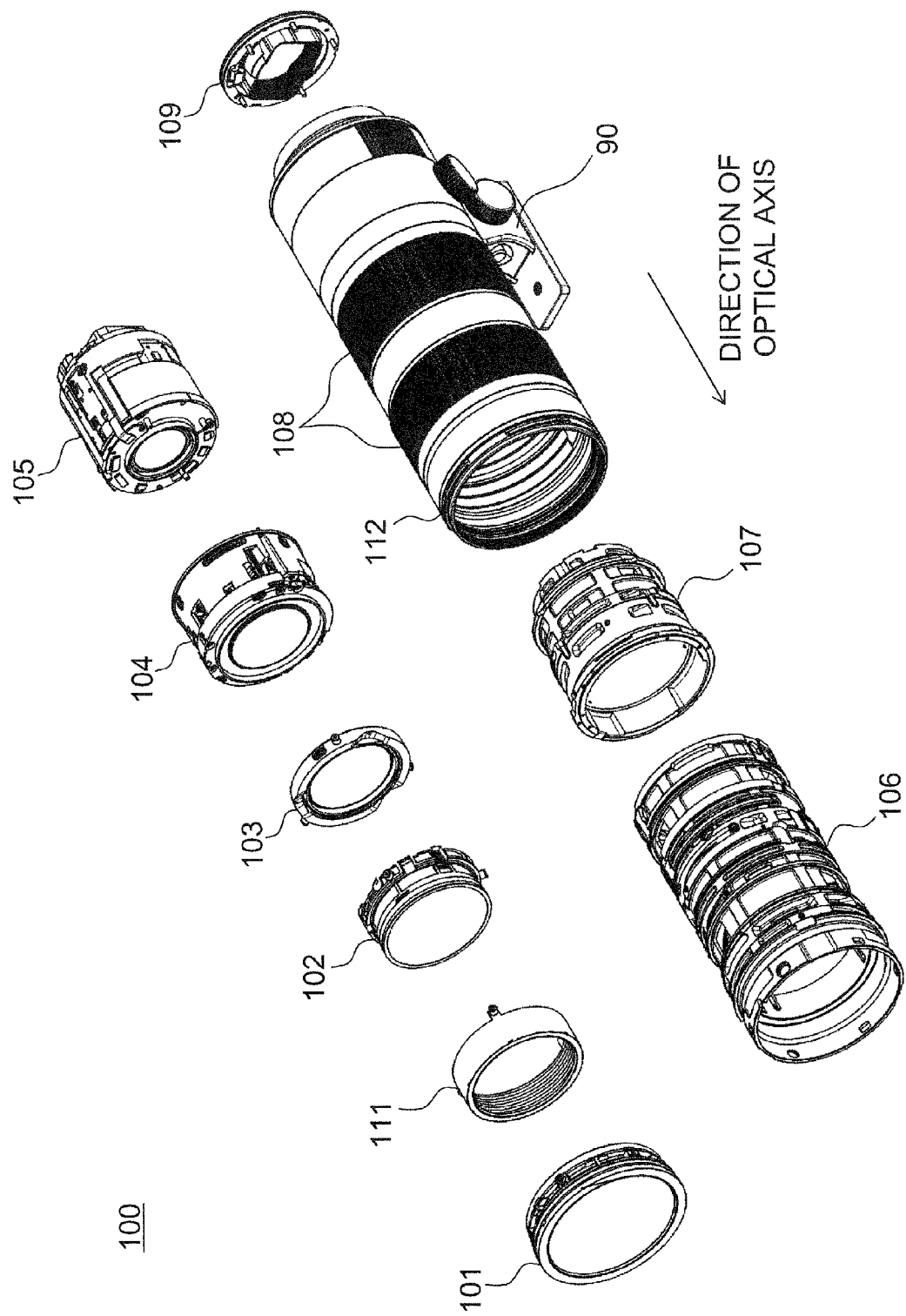
FIG. 2 is an exploded perspective view of the lens barrel according to the embodiment.

FIG. 2 is an exploded perspective view of lens barrel 100 according to the embodiment, illustrating lens barrel 100 having tripod mount 90 attached thereto. Lens barrel 100 includes: first group unit 101 which includes a fixed lens; second group unit 102 to which a zoom lens is fixed; third group unit 103 to which a zoom lens is fixed; fourth-to-sixth group unit 104 which includes an image stabilizer incorporated therein; and seventh-to-ninth group unit 105 which includes a focus lens incorporated therein. Lens barrel 100 further includes first fixing frame 106, second fixing frame 107, and light shielding frame unit 111. The group units mentioned above form a lens unit which is disposed within exterior member 112, together with first fixing frame 106 and second fixing frame 107.

Second group unit 102 and third group unit 103 are engaged with a cam mechanism provided in the inner circumferential surface of first fixing frame 106, and moves in a reciprocating fashion in the direction of the optical axis of lens barrel 100, thereby changing the focal length of the lens unit included in lens barrel 100.

Seventh-to-ninth group unit 105 includes a focus motor for moving the focus lens in the direction of the optical axis, and moves the focus lens according to an electrical instruction.

Fourth-to-sixth group unit 104 includes an image stabilization lens and is equipped with an actuator which moves the image stabilization lens. Fourth-to-sixth group unit 104 moves the image stabilization lens on a plane perpendicular to the optical axis, according to an electrical signal, to compensate for image blur.

Second fixing frame 107 forms a base for the entirety of lens barrel 100. Seventh-to-ninth group unit 105 is disposed on the inner circumferential side of second fixing frame 107. Fourth-to-sixth group unit 104 and first fixing frame 106 are disposed in front of second fixing frame 107 in the direction of the optical axis. Mount 109 is fixed behind second fixing frame 107 in the direction of the optical axis.

Light shielding frame unit 111 has a role to play in shielding unnecessary light from externally entering second group unit 102.

[2. Configuration of Fourth-to-Sixth Group Unit]

Figure 3:
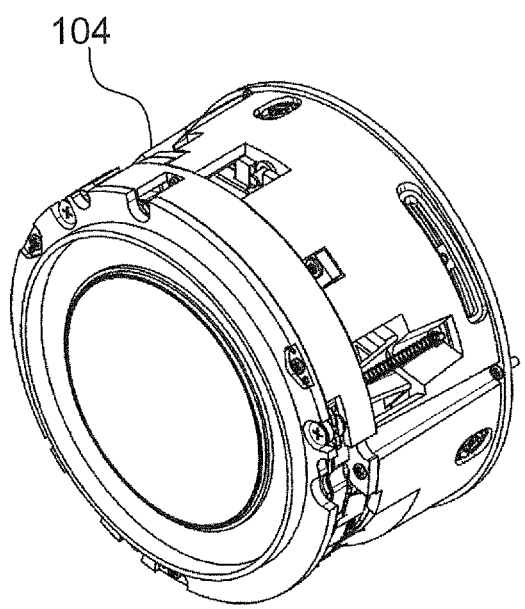
FIG. 3 is a perspective view of a fourth-to-sixth group unit according to the embodiment.
Figure 4:
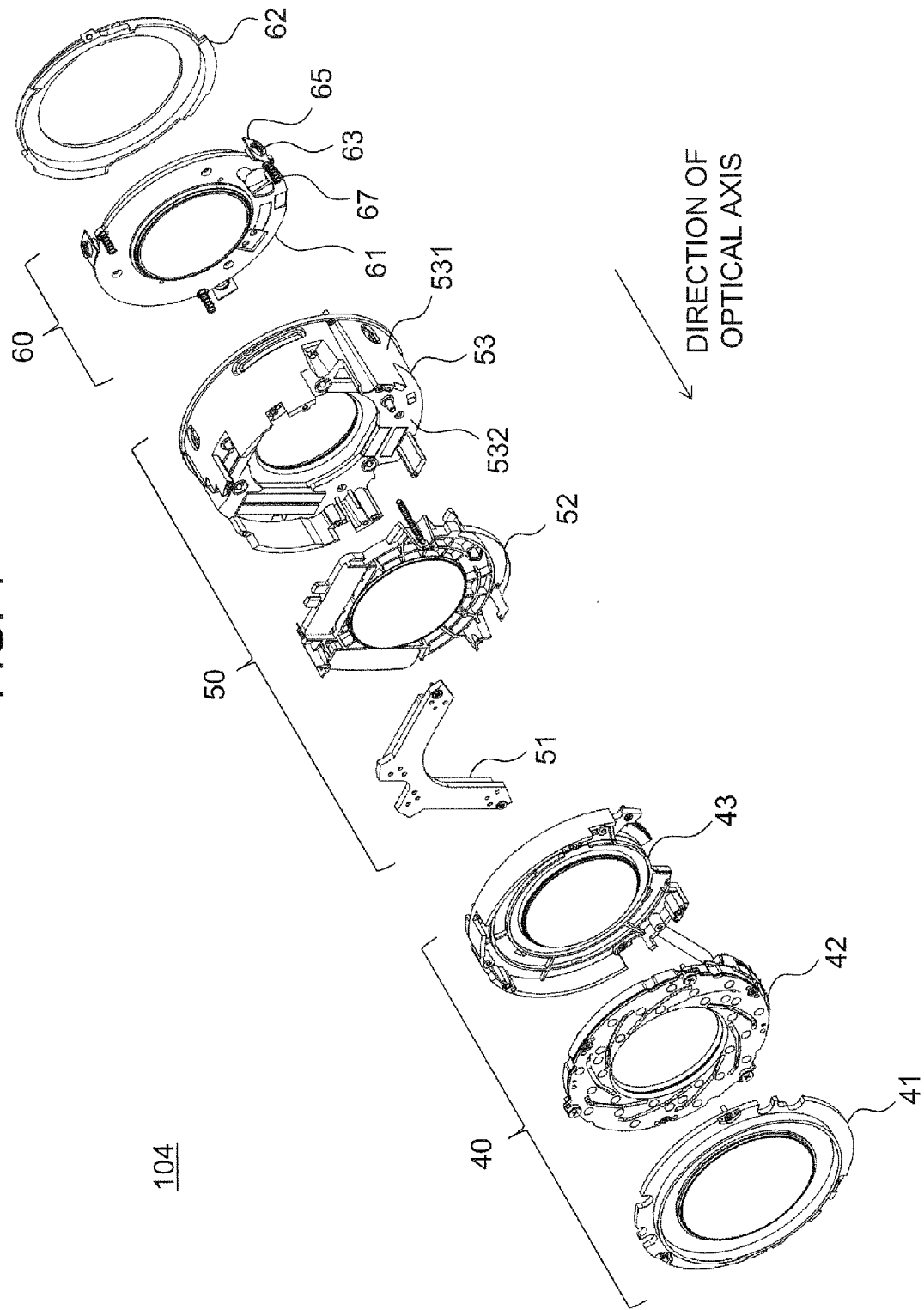
FIG. 4 is an exploded perspective view of the fourth-to-sixth group unit according to the embodiment.

In the following, fourth-to-sixth group unit 104 is described in detail. FIG. 3 is a perspective view of fourth-to-sixth group unit 104 according to the embodiment. FIG. 4 is an exploded perspective view of fourth-to-sixth group unit 104 according to the embodiment.

As illustrated in FIG. 4, fourth-to-sixth group unit 104 includes fourth group section 40, fifth group section 50, sixth group section 60, and sixth-group adjusting ring 62. Fourth group section 40 includes lens frame 41 having a lens fixed thereto, lens frame 43 having a lens fixed thereto, and diaphragm unit 42 which adjusts an amount of light incident on the lens fixed to lens frame 43. Fifth group section 50 includes: optical image stabilization (OIS) magnet unit 51 which is a part of the actuator which drives the image stabilization lens; OIS frame 52 having the image stabilization lens fixed thereto; and base frame 53 which is a base for the entirety of fourth-to-sixth group unit 104. Sixth group section 60 includes sixth-group frame 61 (an example of a lens frame) having a lens fixed thereto. Sixth-group adjusting ring 62 is for adjusting the position of the lens, and is included in sixth group section 60, in the direction of the optical axis.

In the present embodiment, sixth-group frame 61 is configured so that the position thereof is adjustable. Sixth-group frame 61 can cancel effects of an error of each component (e.g., fabrication tolerance) and assembly tolerances (e.g., variations), etc. by, for example, being fixed at a position offset from the designed center purposefully, thereby achieving an enhancement of optical performance of the entirety of lens barrel 100.

[3. Detailed Description of Mechanism for Adjusting Position of Sixth-Group Frame]

In the following, the above-mentioned configuration in which the position of sixth-group frame 61 is adjusted is described in detail, with reference to FIGS. 5A through 7D.

Figure 5A:
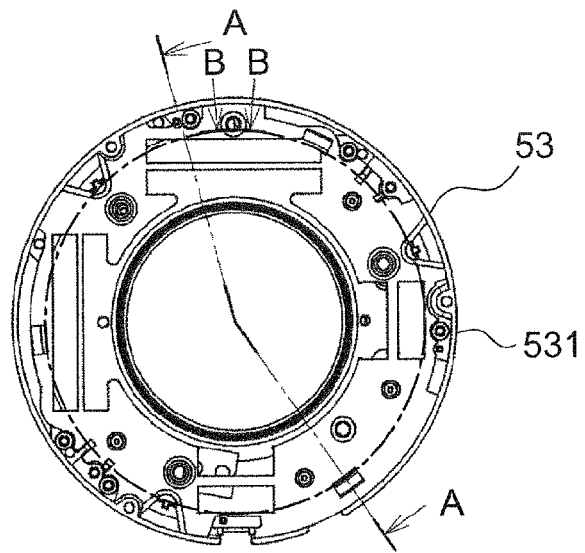
FIG. 5A is a front view of a fifth-group base frame for illustrating a mechanism for adjusting a position of a sixth-group frame according to the embodiment.
Figure 5B:
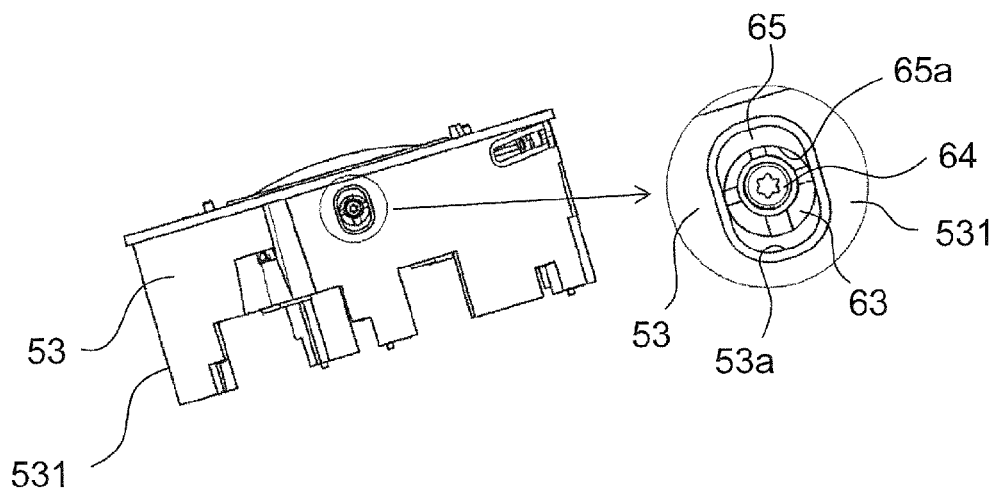
FIG. 5B is a side view of the fifth-group base frame for illustrating the mechanisms for the position adjustment in FIG. 5A.
Figure 5C:
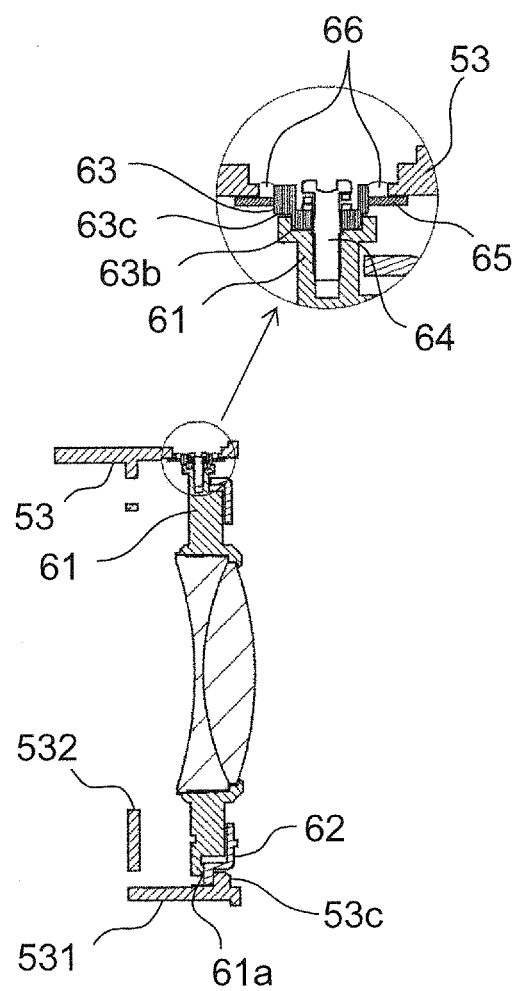
FIG. 5C is a cross-sectional view of the fifth-group base frame in FIG. 5A, taken along a line A-A extending in the radial direction of the fifth-group base frame and passing through the center of the fifth-group base frame.

FIGS. 5A through 5D are illustrations of the mechanisms for adjusting the position of sixth-group frame 61 according to the embodiment. FIG. 5A is a front view of fifth-group base frame 53 for illustrating the mechanisms for adjusting the position of sixth-group frame 61 according to the embodiment. FIG. 5B is a side view of fifth-group base frame 53 for illustrating the mechanisms for the position adjustment in FIG. 5A. FIG. 5C is a cross-sectional view of fifth-group base frame 53 in FIG. 5A, taken along a line A-A extending in the radial direction of fifth-group base frame 53 and passing through the center of fifth-group base frame 53. FIG. 5D is an exploded cross-section view of fifth-group base frame 53 in FIG. 5A, taken along a line B-B extending in the circumferential direction of fifth-group base frame 53.

In the present embodiment, the following two positions of sixth-group frame 61 relative to base frame 53 are adjustable.

(i) Relative position (eccentricity and eccentric direction) on the plane perpendicular to the optical axis of lens barrel 100.

(ii) Relative position in the optical axis of lens barrel 100.

In the following, the mechanisms of the position adjustment with respect to the above two positions are described one by one.

First, a mechanism (in connection with item (i)) for adjusting the position of sixth-group frame 61 relative to base frame 53 on the plane perpendicular to the optical axis is described.

Referring to FIGS. 4, 5B, and 5C, base frame 53 has a cylinder-like shape. Base frame 53 integrally includes cylindrical sidewall 531 and partition 532 which is in an annular-plate shape and disposed in the middle of sidewall 531 in the direction of the optical axis. Partition 532 extends substantially perpendicular to the optical axis. Partition 532 has an opening in the center thereof. Adjustment holes 53a are formed in sidewall 531 of base frame 53, passing through sidewall 531. Adjustment holes 53a are lengthened in the direction of the optical axis. In the present embodiment, adjustment holes 53a are elongated holes having oval shapes, and the longitudinal directions of adjustment holes 53a are the direction of the optical axis. In the present embodiment, three adjustment holes 53a including those not shown are evenly arranged in the circumferential direction of sidewall 531. It should be noted that the shapes, number, and arrangement of adjustment holes 53a are not limited thereto and may arbitrary be determined. Here, adjustment hole 53a is an example of a first through-hole, and sidewall 531 and partition 532 of base frame 53 constitute an example of the frame portion of the base frame.

Figure 6:
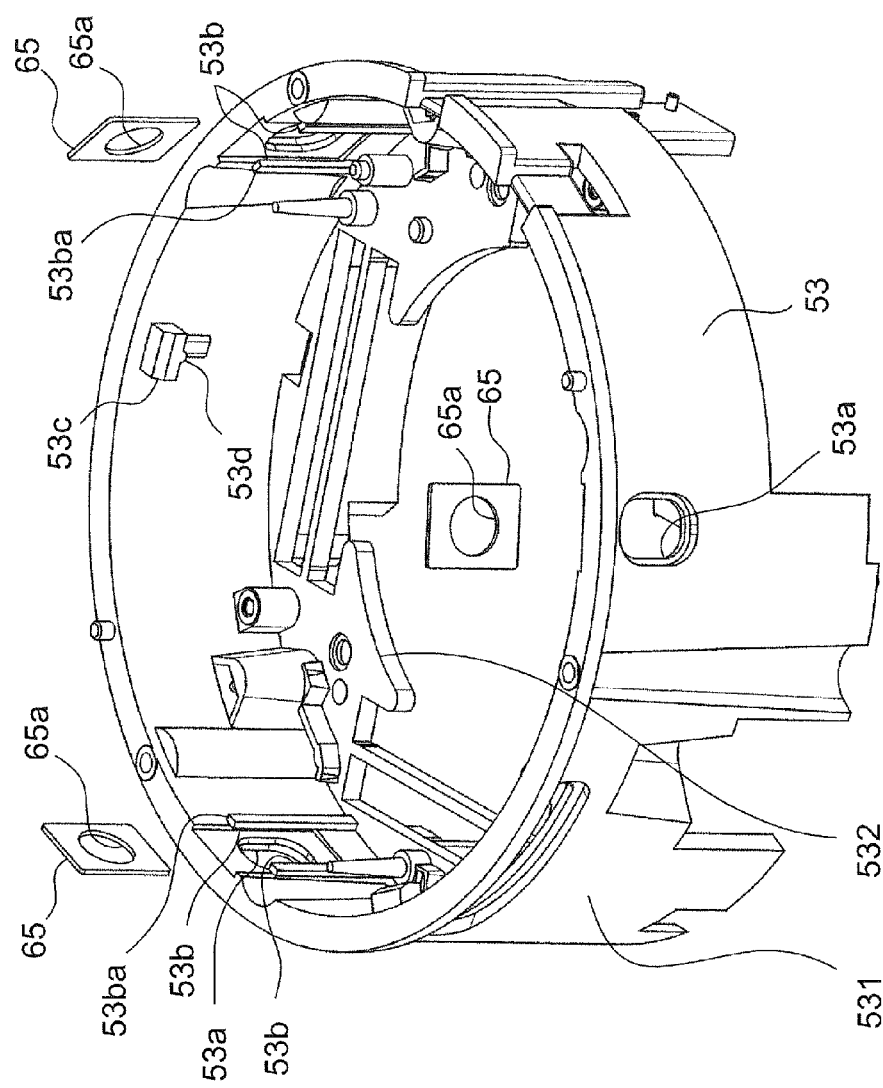
FIG. 6 is a perspective view of the fifth-group base frame showing relationship between the fifth-group base frame and an adhesion plate according to the embodiment.

FIG. 6 is a perspective view of fifth-group base frame 53 showing a relationship between fifth-group base frame 53 and adhesion plate 65 according to the embodiment. Referring to FIG. 6, adhesion plate 65 in a rectangular flat plate shape is provided in a vicinity of each adjustment hole 53a within sidewall 531 of base frame 53. Round hole 65a is formed in adhesion plate 65, passing through adhesion plate 65. In the vicinity of each adjustment hole 53a, two protrusions 53ba, each of which is protruding integrally from the inner circumferential surface of sidewall 531, form two opposed slits 53b between the inner circumferential surface of sidewall 531 and protrusions 53ba. Protrusions 53ba and slits 53b are formed on both sides of each adjustment hole 53a in the circumferential direction of sidewall 531, extending in the direction of the optical axis. Both sides of each adhesion plate 65 are inserted in two opposed slits 53b and held by protrusions 53ba. This allows adhesion plate 65 held by protrusions 53ba to be positioned facing adjustment hole 53a and movable in the direction of the optical axis, along the inner circumferential surface of sidewall 531. Here, hole 65a of adhesion plate 65 is an example of a second through-hole.

Referring to FIGS. 5B and 5C, three cylindrical eccentric pins 63 are engaged with the outer periphery of annular-plate-shaped sixth-group frame 61 and further fixed to the outer periphery with thread 64 having a washer. Three eccentric pins 63 are evenly arranged in the circumferential direction of the outer periphery of sixth-group frame 61 and are protruding out in the radial direction of sixth-group frame 61. The positions of three eccentric pins 63 correspond to the positions of three adjustment holes 53a of base frame 53. To assemble sixth-group frame 61 into base frame 53, eccentric pins 63 are inserted into respective adjustment holes 53a of base frame 53 and also inserted into holes 65a of respective adhesion plates 65 and then fixed to sixth-group frame 61. Here, eccentric pin 63 fixed to the outer periphery of sixth-group frame 61 with thread 64 is an example of a projection.

Figure 7A:
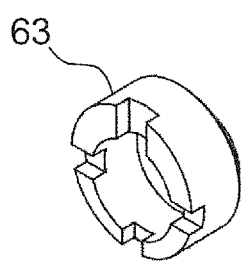
FIG. 7A is a perspective view of an eccentric pin according to the embodiment.
Figure 7B:
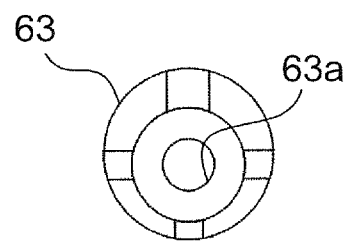
FIG. 7B is a front view of the eccentric pin in FIG. 7A.
Figure 7C:
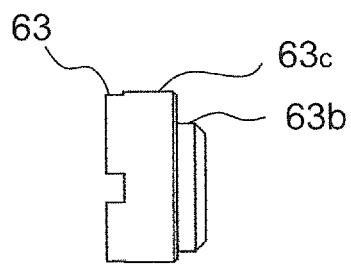
FIG. 7C is a side view of the eccentric pin in FIG. 7A.
Figure 7D:
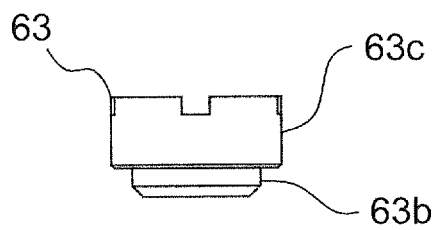
FIG. 7D is a bottom view of the eccentric pin in FIG. 7A.

Referring to FIGS. 5B, 5C, and 7A to 7D, configuration of eccentric pins 63 is described. FIG. 7A is a perspective view of eccentric pin 63 according to the embodiment. FIG. 7B is a front view of eccentric pin 63 in FIG. 7A. FIG. 7C is a side view of eccentric pin 63 in FIG. 7A. FIG. 7D is a bottom view of eccentric pin 63 in FIG. 7A. Eccentric pins 63 each have hole 63a through which thread 64 is inserted. Hole 63a has the center offset from the center of the perimeter shape (round shape) of eccentric pin 63. Eccentric pins 63 each integrally have cylindrical first portion 63b and cylindrical second portion 63c on the distal side and the proximal side, respectively, of eccentric pin 63 with respect to sixth-group frame 61. First portion 63b is located on a sixth-group frame 61 side and second portion 63c is located on a base frame 53 side. In the present embodiment, the outer diameter center of first portion 63b is purposefully offset from the outer diameter center of second portion 63c in the radial direction of first portion 63b and second portion 63c. In other words, the axis of second portion 63c is located eccentrically from the axis of first portion 63b in the radial direction. First portion 63b is engaged into a cylindrical recess formed in the outer periphery of sixth-group frame 61. Second portion 63c is inserted in hole 65a of adhesion plate 65 and adjustment hole 53a of base frame 53. Thread 64 passes through hole 63a formed in first portion 63b. Thus, second portion 63c of eccentric pins 63 is located eccentrically from thread 64 in the radial direction as well.

Referring to FIGS. 5B and 5C, in the present embodiment, hole 65a of adhesion plate 65 is, as described below, formed to have a shape and dimensions equal to those of second portion 63c of eccentric pin 63. Adjustment hole 53a of base frame 53 is formed to have a dimension greater than a diameter of second portion 63c in the longitudinal direction, and have a dimension equal to a diameter of second portion 63c in the transverse direction. Thus, a gap between second portion 63c and hole 65a is smaller than a gap between second portion 63c and adjustment holes 53a.

When thread 64 is in a loosened state by a predetermined amount relative to a fully-tightened state, eccentric pin 63 is loosely fastened to sixth-group frame 61 while being held down on sixth-group frame 61 due to the spring-like property of the washer. This allows eccentric pin 63 to rotate, relative to sixth-group frame 61, about thread 64 and first portion 63b. At this time, the rotation of second portion 63c of eccentric pin 63 about the axis of second portion 63c causes first portion 63b and thread 64 to rotate eccentrically from their axes, that is, causes first portion 63b and thread 64 to revolve around the axis of second portion 63c. This displaces sixth-group frame 61 engaged with first portion 63b in the circumferential direction of sidewall 531 of base frame 53. Thus, the positional relationship between the axis of sixth-group frame 61 and the axis of base frame 53 changes. It should be noted that adhesion plate 65 engaged with second portion 63c is not moved. Moreover, a position of sixth-group frame 61 relative to base frame 53 (eccentricity and eccentric direction) on a plane perpendicular to the axis of sixth-group frame 61, that is, the optical axis of sixth-group frame 61 is adjustable by adjusting angles of rotations of three eccentric pins 63.

Next, a mechanism (in connection with item (ii)) for adjusting the position of sixth-group frame 61 relative to base frame 53 in the direction of the optical axis is described.

Referring to FIGS. 5D and 6, sixth-group frame 61 is biased to base frame 53 in the direction of the optical axis by three biasing springs 67. Protrusions 53c are each integrally formed on sidewall 531 of base frame 53. Protrusions 53c protrude from the inner circumferential surface of sidewall 531, protrusions 53c protruding radially inward of sidewall 531 in a direction intersecting with the optical axis. In the present embodiment, three protrusions 53c are formed. Three protrusions 53c are disposed spaced apart from partition 532 of base frame 53 in the direction of the optical axis, three protrusions 53c being disposed evenly, spaced apart from one another, in the circumferential direction of sidewall 531. Protrusions 53c each integrally have bump 53d projecting in the direction of the optical axis toward partition 532. Sixth-group frame 61 is disposed between partition 532 and three protrusions 53c. Further, partition 532 is integrally formed with three spring axes 532a extending in the direction of the optical axis toward protrusions 53c. Biasing springs 67 are disposed on spring axes 532a. In the present embodiment, biasing springs 67 are coil springs. However, the present disclosure is not limited thereto, and biasing springs 67 may be springs of any configuration. The tips of spring axes 532a are loosely engaged with sixth-group frame 61 and roughly place sixth-group frame 61 in position.

Sixth-group adjusting ring 62 in an annular-plate shape is also disposed between sixth-group frame 61 and three protrusions 53c. This causes sixth-group adjusting ring 62 to be sandwiched between protrusions 53c and sixth-group frame 61. Sixth-group frame 61 integrally includes bumps 61a each projecting in the direction of the optical axis toward sixth-group adjusting ring 62. In the present embodiment, three bumps 61a are arranged evenly in the circumferential direction of sixth-group frame 61. The positions of bumps 61a correspond to the positions of bumps 53d of protrusions 53c of base frame 53. Bump 61a of sixth-group frame 61 and bump 53d of protrusion 53c are located, for example, facing each other. Bumps 61a and 53d are in contact with sixth-group adjusting ring 62 from both sides to sandwich sixth-group adjusting ring 62 therebetween. This can prevent surface contact of sixth-group frame 61 and protrusions 53c with sixth-group adjusting ring 62. Thus, sixth-group frame 61 and protrusions 53c are allowed to be in contact with sixth-group adjusting ring 62 via bumps 61a and 53d, even if sixth-group frame 61 or sixth-group adjusting ring 62 is deformed, such as warped, deflected, strained, etc. Further, due to the biasing by biasing springs 67, sixth-group frame 61 and protrusions 53c are maintained in contact with sixth-group adjusting ring 62. Moreover, owing to the configuration in which sixth-group adjusting ring 62 is sandwiched between protrusions 53c and sixth-group frame 61, sixth-group frame 61, sixth-group adjusting ring 62, and biasing springs 67 can be accommodated within sidewall 531 of base frame 53.

The above causes sixth-group frame 61 to be held down on base frame 53 via sixth-group adjusting ring 62.

The surface of sixth-group adjusting ring 62 which is in contact with bumps 61a of sixth-group frame 61 is plane, specifically, a flat surface. On the other hand, the surface of sixth-group adjusting ring 62 which is in contact with bumps 53d of base frame 53 forms sloped surfaces 62a angled with respect to the surface of sixth-group adjusting ring 62 in contact with bumps 61a. Sloped surfaces 62a extend angularly about the optical axis, specifically, arcuately along the circumferential direction of sixth-group adjusting ring 62. The portions of sixth-group adjusting ring 62 where sloped surfaces 62a, that is, the adjustment portions of sixth-group adjusting ring 62 are formed form arcuate portions of sixth-group adjusting ring 62. Sloped surfaces 62a are angled to gradually change, in the circumferential direction of sixth-group adjusting ring 62, the thickness of sixth-group adjusting ring 62 in the direction of the optical axis, for example, to gently change it continuously at a constant rate. Three sloped surfaces 62a are evenly disposed in the circumferential direction of sixth-group adjusting ring 62 so as to correspond to three protrusions 53c. Further, angled orientations of three sloped surfaces 62a in the circumferential direction of sixth-group adjusting ring 62 are the same.

Here, the rotation of sixth-group adjusting ring 62 about the optical axis causes the adjustment portions of sixth-group adjusting ring 62, which are sandwiched between bumps 61a of sixth-group frame 61 and bumps 53d of protrusion 53c of base frame 53, to vary in thickness. Consequently, a gap between sixth-group frame 61 and protrusion 53c is caused to vary. Thus, the position of sixth-group frame 61 relative to protrusion 53c changes in the direction of the optical axis. The position of sixth-group frame 61 in the direction of the optical axis can be adjusted by adjusting the angle of rotation of sixth-group adjusting ring 62. Sloped surfaces 62a are evenly disposed, bumps 61a are evenly disposed, and bumps 53d are evenly disposed, and thus the entirety of sixth-group frame 61 is allowed to move evenly in substantially parallel to the direction of the optical axis in response to the rotation of sixth-group adjusting ring 62. Moreover, since the adjustment portions having sloped surfaces 62a of sixth-group adjusting ring 62 are sandwiched between bumps 61a of sixth-group frame 61 and bumps 53d of base frame 53, the adjustment portions are not required to have high strength. Thus, sixth-group adjusting ring 62 can be thinned.

The method for adjusting the position of sixth-group frame 61 in the direction of the optical axis by using sixth-group adjusting ring 62 the thickness thereof varies in the circumferential direction in this manner has the following advantageous effects:

Since the position of sixth-group frame 61 in the direction of the optical axis depends on a distribution of the thickness of sixth-group adjusting ring 62, accuracy in adjusting the position of sixth-group frame 61 is hardly affected by a deformation of sixth-group adjusting ring 62, such as warping, deflection, strain, etc.

Owing to the simple shape of sixth-group adjusting ring 62, mass production of sixth-group adjusting ring 62 is facilitated by a manufacturing method such as resin molding.

The adjustment of the position of sixth-group frame 61 only uses thin sixth-group adjusting ring 62 and biasing springs 67, thereby achieving space saving.

As above, according to the present embodiment, the position of sixth-group frame 61 is allowed to be accurately adjusted in the direction of the optical axis in the simple configuration.

As described above, according to the mechanism for adjusting the position of sixth-group frame 61 of the present embodiment, the position of sixth-group frame 61 relative to base frame 53 can be adjusted on the plane perpendicular to the optical axis by rotating eccentric pins 63, and adjusted in the direction of the optical axis by adjusting the angle of rotation of sixth-group adjusting ring 62. These adjustments can be carried out independent of each other. Stated differently, the position of sixth-group frame 61 in the direction of the optical axis is not changed when the eccentricity and eccentric direction of sixth-group frame 61 are adjusted to adjust the position of sixth-group frame 61 relative to base frame 53. Likewise, the eccentricity and eccentric direction of sixth-group frame 61 is not changed when the position of sixth-group frame 61 in the direction of the optical axis is adjusted to adjust the position of sixth-group frame 61 relative to base frame 53.

[4. Detailed Description of Method for Fixing Sixth-Group Frame]

As illustrated in FIG. 6, adhesion plates 65 are each inserted in slits 53b formed on the inner circumferential surface of sidewall 531 of base frame 53. This allows adhesion plates 65 to freely move in the direction of the optical axis relative to base frame 53, but movement of adhesion plates 65 in the other directions is restricted.

Holes 65a of adhesion plates 65 are open at diameters slightly greater than the outer diameters of eccentric pins 63. In other words, the diameters of holes 65a of adhesion plates 65 are equal to the outer diameters of eccentric pins 63. Each eccentric pin 63 is inserted in each adjustment hole 53a of base frame 53 while being inserted in and engaged with hole 65a of each adhesion plate 65. At this time, since adjustment holes 53a are elongated holes, eccentric pins 63 are each movable in the direction of the optical axis, together with adhesion plate 65. As illustrated in FIG. 5C, after the position of sixth-group frame 61 relative to base frame 53 has been adjusted by rotating eccentric pins 63 and sixth-group adjusting ring 62, the areas surrounded by adjustment holes 53a of base frame 53, eccentric pins 63, and adhesion plates 65 are filled with ultraviolet curable adhesive 66. As adhesive 66 receives ultraviolet rays, adhesive 66 cures and fixes sixth-group frame 61 to base frame 53. Specifically, cured adhesive 66 causes base frame 53, eccentric pins 63, and adhesion plate 65 to be fixed to each other, thereby achieving the fixation of sixth-group frame 61 to base frame 53. It should be noted that the adhesive used is not limited to an ultraviolet curable adhesive, and may be any adhesive. Here, cured adhesive 66 is an example of an adhesively fixing portion.

Using adhesion plate 65 at the adhesion portion yields the following advantageous effects, for example.

First advantageous effect is stability of the adhesive applied.

If adhesion plate 65 is absent, a large gap formed between adjustment hole 53a of base frame 53 and eccentric pin 63 need to be filled with the adhesive to fix eccentric pin 63 to base frame 53. To this end, a method is required for bridging the gap using an adhesive having a high viscosity, for example. In this case, it is difficult to stably apply the adhesive, and, in the worst scenario, an adhesive squeezed out onto the inner circumferential surface of sidewall 531 of base frame 53 remains uncured. Then, the uncured adhesive may flow out later and cause problems such as the adhesive being deposited on nearby movable parts.

On the other hand, if adhesion plate 65 is present, the gap formed between adjustment hole 53a of base frame 53 and eccentric pin 63 is covered from one of both sides with adhesion plate 65. For this reason, even an adhesive having a relatively low viscosity can be applied to the gap, which improves workability of adhesive application. Moreover, adhesion plate 65 eliminates the concern with the adhesive squeezing out onto the inner circumferential surface of sidewall 531 of base frame 53, and thus eliminating any problem caused by the adhesive squeezing out.

The second advantageous effect is strength.

If adhesion plate 65 is absent, only the adhesive is present between adjustment hole 53a of base frame 53 and eccentric pin 63. In other words, only the adhesive in the gap between adjustment hole 53a and eccentric pin 63 forms the fixed portion where base frame 53 and eccentric pin 63 are fixed. For this reason, if an external force such as a drop impact is applied to the fixed portion after base frame 53 and eccentric pin 63 are fixed to each other, the strength of the cured adhesive as it is becomes the strength of the fixed portion. Thus, the strength of the fixed portion is low.

On the other hand, if adhesion plate 65 is present, the adhesive fixes base frame 53 and eccentric pin 63 to each other via adhesion plate 65, and the adhesive and adhesion plate 65 form the fixed portion. For this reason, the adhesive has large adhered areas that span between adhesion plate 65 and base frame 53 and between adhesion plate 65 eccentric pin 63. Moreover, even if an external force such as a drop impact is applied to the fixed portion, the force is distributed to adhesion plate 65, thereby reducing the stress acting on the cured adhesive. As a result, compared to the case using only an adhesive, fixation strength of the fixed portion using an adhesive and adhesion plate 65 is high. Moreover, since the concern with the adhesive squeezing out onto the inner circumferential surface of sidewall 531 of base frame 53 is eliminated, an adequate amount of the adhesive can be used to fix the fixed portion. For this reason, sixth-group frame 61 can be fixed rigidly to base frame 53, thereby improving the fixation strength. In this manner, the strength of the adjusted portion of sixth-group frame 61 as a lens frame is improved.

As above, the involvement of adhesion plate 65 at the adhesion portion stabilizes the adhesive application and improves adhesive fixation strength.

While the above embodiment has been described with reference to eccentric pins 63 being adhesively fixed to base frame 53, the present disclosure is not limited thereto.

For example, another through-hole different from adjustment holes 53a may be formed in base frame 53 and another projection different from eccentric pins 63 may be disposed at a position facing the through-hole in sixth-group frame 61, to adhesively fix the projection to the through-hole.

Moreover, while adhesion plate 65 is not particularly described in detail, adhesion plate 65 may be fabricated by being stamped out from a metal sheet by press working, or may be fabricated by a method such as metal cutting work or resin molding, for example. While the present embodiment has been described with reference to adhesion plate 65 being in a rectangular flat plate shape, an adhesion plate in any other shape yields the same advantageous effects of the present disclosure.

Other Embodiments

As such, the embodiment has been described as an example of the technology disclosed herein. The technology according to the present disclosure is, however, not limited thereto and is applicable to any embodiments to which modifications, permutations, additions, and omissions, etc., are made as appropriate. Moreover, the components set forth with reference to the above embodiment and other embodiments below may be combined into a new embodiment. For this purpose, other embodiments are illustrated in the following.

While lens barrel 100 according to the embodiment has the configuration for adjusting the position of sixth-group frame 61 in the direction of the optical axis and the direction perpendicular to the optical axis, the configuration may be applied also to any component included in lens barrel 100 where such position adjustment is necessary.

While in lens barrel 100 according to the embodiment, biasing springs 67 biases sixth-group frame 61 to sixth-group adjusting ring 62 and base frame 53, the present disclosure is not limited thereto. The biasing spring may bias base frame 53 to sixth-group adjusting ring 62 and sixth-group frame 61, or may bias sixth-group frame 61 and base frame 53 to sixth-group adjusting ring 62.

As described above, the embodiment and the other embodiments have been provided with reference to the accompanying drawings and detailed description. Those embodiments are provided to a person skilled in the art to illustrate the subject matter recited in the appended claims, with reference to particular embodiments. Thus, the components set forth in the accompanying drawings and detailed description may include not only components essential to solve the problems but also other components non-essential. Hence, those non-essential components should not be acknowledged essential due to the mere fact that they are depicted in the accompanying drawings or set forth in the detailed description. Moreover, various modifications, permutations, additions, and omissions can be made to the above embodiments in the scope of the appended claims and the equivalents thereof.

INDUSTRIAL APPLICABILITY

The present disclosure is applicable to lens barrels for use in digital still cameras, etc.

What is claimed is:

1. A lens barrel comprising:
a base frame having a first through-hole;
an adhesion plate having a second through-hole;
a lens frame to which a lens is fixed, the lens frame being disposed within the base frame; and an adhesively fixing portion fixing the lens frame to the base frame, wherein
the adhesion plate is disposed in a vicinity of the first through-hole and movably held by the base frame,
the lens frame includes a projection projecting radially relative to an optical axis of the lens barrel, the projection being engaged with the second through-hole and inserted in the first through-hole,
the projection is movable within the first through-hole so as to change a position of the lens frame relative to the base frame, and
the adhesively fixing portion is disposed in the first through-hole and fixes the projection of the lens frame, the base frame, and the adhesion plate to each other.

2. The lens barrel according to claim 1, further comprising an adjusting ring including an arcuate portion which is sandwiched between the base frame and the lens frame in a direction of the optical axis, wherein
the arcuate portion varies in thickness angularly about the optical axis.

3. The lens barrel according to claim 1, wherein a gap between the projection of the lens frame and the second through-hole is less than a gap between the projection of the lens frame and the first through-hole.

4. The lens barrel according to claim 3, wherein the second through-hole has a shape and a dimension equal to a shape and a dimension of a perimeter of the projection of the lens frame.

5. The lens barrel according to claim 1, wherein
the projection of the lens frame includes a first portion which is rotatably disposed on a proximal side of the projection, and a second portion which is disposed eccentrically from the first portion on a distal side of the projection and rotates integrally with the first portion, and
the second portion rotates the first portion and moves the lens frame by rotating.

6. The lens barrel according to claim 5, wherein the second through-hole has a shape and a dimension equal to a shape and a dimension of a perimeter of the second portion of the lens frame.

7. The lens barrel according to claim 1, wherein the adhesion plate is movably held by the base frame along a wall, in which the first through-hole is formed, of the base frame.

8. The lens barrel according to claim 1, wherein
the projection of the lens frame comprises a plurality of projections and the first through hole comprises a plurality of first through-holes, the plurality of projections being disposed spaced apart from one another angularly about the optical axis, the plurality of first through-holes being disposed spaced apart from one another angularly about the optical axis.

* * * * *